United States Patent [19]

Sensui

[11] Patent Number: 5,293,535
[45] Date of Patent: Mar. 8, 1994

[54] EYE DIRECTION DETECTING DEVICE

[75] Inventor: Takayuki Sensui, Tokyo, Japan

[73] Assignee: Asahi Kogaku Kogyo Kabushiki Kaisha, Tokyo, Japan

[21] Appl. No.: 981,384

[22] Filed: Nov. 25, 1992

[30] Foreign Application Priority Data

Nov. 29, 1991 [JP] Japan .................................. 3-357384

[51] Int. Cl.⁵ ............................................. G03B 7/00
[52] U.S. Cl. ..................................... 354/410; 354/62; 354/219
[58] Field of Search ............... 354/400, 402, 410, 219, 354/62; 351/212

[56] References Cited

U.S. PATENT DOCUMENTS

| Re. 31,370 | 9/1983 | Mashimo et al. |
|---|---|---|
| 3,701,309 | 10/1972 | Thiele et al. |
| 4,047,187 | 9/1977 | Mashimo et al. |
| 4,183,642 | 1/1980 | Fukuoka |
| 4,287,410 | 9/1981 | Crane et al. |
| 4,445,757 | 5/1984 | Enomoto et al. |
| 4,508,443 | 4/1985 | Matsuzaki et al. |
| 4,560,863 | 12/1985 | Matsumura et al. |
| 4,574,314 | 3/1986 | Weinblatt |
| 4,636,624 | 1/1987 | Ishida et al. |
| 4,786,934 | 11/1988 | Kunze et al. |
| 4,828,381 | 5/1989 | Shindo |
| 5,036,347 | 7/1991 | Tsunekawa et al. |
| 5,062,702 | 11/1991 | Brille ................................. 351/212 |
| 5,155,516 | 10/1992 | Shindo |
| 5,182,443 | 1/1993 | Suda et al. ......................... 354/400 |
| 5,214,466 | 5/1993 | Nagano et al. .................... 354/402 |
| 5,225,862 | 7/1993 | Nagano et al. .................... 354/400 |

FOREIGN PATENT DOCUMENTS

| 0055338 | 7/1982 | European Pat. Off. |
|---|---|---|
| 1211815 | 3/1966 | Fed. Rep. of Germany |
| 3329603 | 3/1984 | Fed. Rep. of Germany |
| 3331264 | 3/1984 | Fed. Rep. of Germany |
| 3336265 | 5/1984 | Fed. Rep. of Germany |
| 3505864 | 8/1985 | Fed. Rep. of Germany |
| 2382056 | 9/1978 | France |
| 59-102202 | 6/1984 | Japan |
| 60-032012 | 2/1985 | Japan |
| 60-041013 | 3/1985 | Japan |
| 61-172552 | 8/1986 | Japan |
| 62-022561 | 2/1987 | Japan |
| 62-047612 | 3/1987 | Japan |
| 62-189415 | 8/1987 | Japan |
| 1-277533 | 11/1988 | Japan |
| 1-241511 | 9/1989 | Japan |
| 1412707 | 11/1975 | United Kingdom |
| 87001571 | 3/1987 | World Int. Prop. O. |

OTHER PUBLICATIONS

G. Schroder, an excerpt from the book "Techische Optik", (Vogel-Verlag, 1974), p. 41, Section 2.3.4, along with an English language translation of the section.

"Methods and Design-Survey of Eye Movement Recording Methods", by Young and Sheena, *Behavior Research Methods and Instrumentation*, pp. 397–429, vol. 7(5), 1975.

Mitsuo Ikeda, "Psychological Physic of Vision", 1975.

John Merchant, "Fixation Point Measurement by the Oculometer Technique", *Optical Engineering*, Jul./Aug. 1974, pp. 339–342.

*Primary Examiner*—Russell E. Adams
*Attorney, Agent, or Firm*—Sandler Greenblum & Bernstein

[57] ABSTRACT

An eye direction detecting device includes a light emitting optical system, which emits detecting light through a first optical path to be made incident upon an eye. A polarization beam splitter provided in the first optical path of the detecting light generates a second optical path. A light receiving optical system is provided in the second optical path, and a ¼ wave plate is provided between the polarization beam splitter and the eye, so that light emitted from the light source can be effectively received by a light receiving element.

15 Claims, 4 Drawing Sheets

EYE DIRECTION DETECTING DEVICE

BACKGROUND OF THE INVENTION

1. Field of the Invention

The present invention relates to an eye direction detecting device that is provided, for example, in a view finder of a camera for detecting a specific point in the view finder at which a photographer's eye gazes.

2. Description of Related Art

An eye direction detecting device (referred to hereinafter as an eye detector) is known, as disclosed, for example in U.S. Pat. No. 5,036,347. In a known eye detector used in a single lens reflex camera, a bundle of rays emitted from a light source, such as a light emitting diode (LED), is made incident upon a photographer's eye through an eyepiece of the view finder. Light reflected by the photographer's eye is converged and received by a light receiving element, such as a CCD sensor, whose output is electrically processed to detect the direction of sight.

In such a known eye detector, outgoing light that is incident upon the photographer's eye, and return light reflected therefrom are transmitted through the eyepiece along the same optical path. Accordingly, it is necessary to provide a beam splitter between the light source and the eyepiece to split the return light path from the incident light path. The beam splitter is usually made of a half mirror.

However, when light is twice transmitted through (or reflected by) the half mirror, the quantity of light which can be received by, the light receiving element will, theoretically, be one fourth the quantity of light emitted by the light source. This is assuming that the quantity of light has not been diminished by optical elements other than the beam splitter.

It is therefore necessary to increase the output of the light source to obtain a sufficient quantity of light for detecting a viewer's line of sight.

SUMMARY OF THE INVENTION

A primary object of the present invention is to provide an eye direction detecting device (eye detector) in which light emitted from a light source can be effectively received by a light receiving element. It is a further object that a sufficient quantity of light can be received by the light receiving element without increasing the output of the light source.

To achieve the object mentioned above, according to the present invention, there is provided an eye detector comprising a light emitting optical system which emits detecting light through a first optical path to be made incident upon an eye, a polarization beam splitter provided in the first optical path of the detecting light to generate a second optical path, a light receiving optical system provided in the second optical path generated by the polarization beam splitter, and a ¼ wave plate provided between the polarization beam splitter and the eye to be detected.

According to another aspect of the present invention, there is provided an eye detector in a single lens reflex camera having a view finder with an eyepiece lens, comprising a light emitting optical system which emits detecting infrared light to be made incident upon the face of an eyepiece lens opposite an eye of a viewer, a polarization beam splitter provided in the optical path of the light emitting optical system to generate a second optical path, a light receiving optical system, provided on the second optical path generated by the polarization beam splitter to receive light reflected by the viewer's eye and to detect the direction of a line of sight of the viewer, and a ¼ wave plate provided between the polarization beam splitter and the viewer's eye.

According to still another aspect of the present invention, an eye detector comprises a light emitting optical system including a polarization beam splitter which reflects detecting infrared laser light or permits the detecting infrared laser light to pass therethrough, and a ¼ wave plate through which the detecting infrared laser light, reflected by or transmitted through the polarization beam splitter, passes. The detecting infrared light transmitted through the ¼ wave plate is then made incident upon an eye to be detected. The eye detector further comprises a light receiving optical system in which light reflected by the eye is transmitted through the ¼ wave plate, and then transmitted through or reflected by the polarization beam splitter (i.e., opposite that of the light emitting optical system) to thereby detect the line of sight direction.

The present disclosure relates to subject matter contained in Japanese patent application No. HEI 3-357384 (filed on Nov. 29, 1991), which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
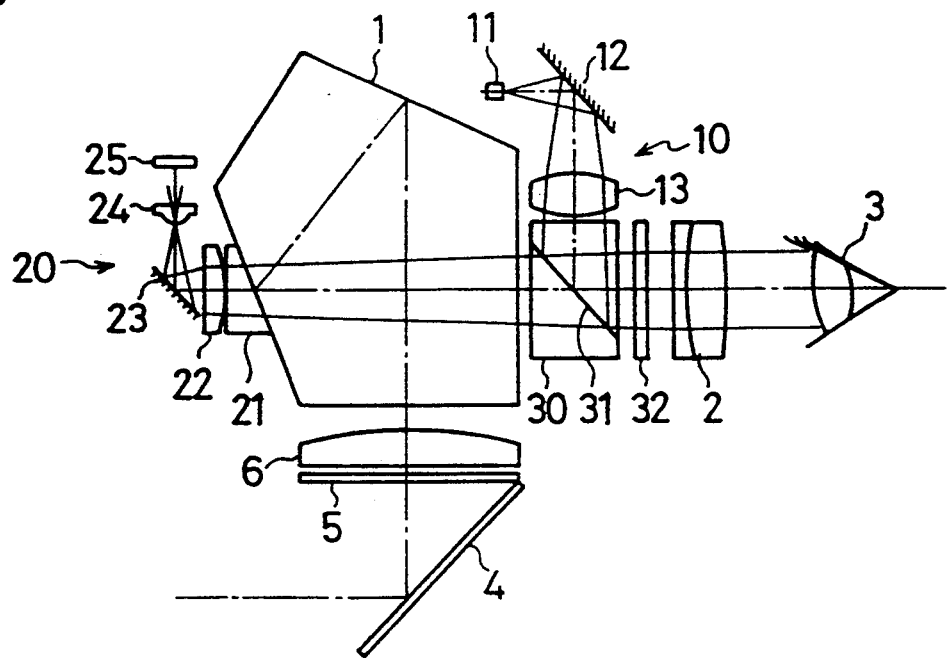
FIG. 1 is an illustrative view of an eye direction detecting device applied to a single lens reflex camera, according to a first embodiment of the present invention.

FIG. 1 shows a first embodiment of an eye direction detecting device (eye detector), incorporated in a view finder of a single lens reflex camera.

In FIG. 1, an eye detector includes light emitting and light receiving optical systems 10 and 20, respectively, which are provided on opposite sides of a pentagonal prism 1 provided in a view finder of a single lens reflex camera. The light emitting optical system 10 is located closer to a photographer's eye than the light receiving optical system 20.

The light emitting optical system 10 has, as a light source, a semiconductor laser 11, which emits infrared light. The semiconductor laser 11 can stably emit infrared light at an electrical current of about 5 mA. Accordingly, the semiconductor laser 11 consumes less electrical power than a light emitting diode (LED), which requires an electrical current of about 300 mA to stably emit light.

Divergent light emitted from the semiconductor laser 11 is reflected by a mirror 12 and is then made incident upon a polarization beam splitter 30 through a condenser lens 13. The semiconductor laser 11 is designed so that an S-polarized light component of the laser beam emitted therefrom is incident upon a beam splitting surface 31 of the polarization beam splitter 30, and reflected thereby. Only a P-polarized light component can be transmitted through the polarization beam splitter 30.

The laser beam incident upon the polarization beam splitter 30 is reflected by the beam splitting surface 31 thereof and is converted to circularly polarized light by a ¼ wave plate 32. The converted laser beam is then collimated by an eyepiece 2 of the view finder to be made incident upon a photographer's eye 3.

The laser beam reflected by the photographer's eye 3 is circularly polarized light having a field vector with a direction of rotation opposite that of light incident thereon. The light reflected by the photographer's eye is then converted back to linearly polarized light, which is P-polarized light with respect to the beam splitting surface 31 of the polarization beam splitter 30, by the ¼ wave plate 32. Consequently, the reflected laser beam is transmitted through the beam splitting surface 31 and transmitted through the pentagonal prism 1, a compensator prism 21 and a reducing lens 22 to be reflected by a mirror 23. The light reflected by the mirror 23 is converged onto a CCD line sensor 25 through an image reforming lens 24.

The direction of a line of sight is detected, for example, based on a relationship between a first Purkinje image and the center of an image of a pupil, formed by light reflected by the photographer's eye. The principle of the detection of a line of sight per se is known, as disclosed, for example in U.S. Pat. No. 5,036,347 mentioned above. Accordingly, no detailed explanation therefor is given herein.

The polarization beam splitter 30 reflects the S-polarized light component of the infrared light, emitted from the semiconductor laser 11, and permits P-polarized light thereof to be transmitted therethrough, as mentioned above. However, visible light can be transmitted through the polarization beam splitter 30, regardless of its polarization.

The bundle of rays that passes through a taking lens (not shown) is reflected by a quick-return mirror 4 to form an image of an object to be taken on a focusing screen 5, before being converged by a condenser lens 6 and formed erect by the pentagonal prism 1. The image is then transmitted through the polarization beam splitter 30, regardless of the polarization state, as mentioned above, to be made incident upon the photographer's eye 3 through the eyepiece 2.

In the illustrated embodiment, a semiconductor laser 11 is used as the light source. Alternatively, it is possible to use a light source that emits unpolarized light (i.e., randomly polarized light), such as a light emitting diode, instead of the semiconductor laser. In this alternative, only an S-polarized light component of the bundle of rays of the non-polarized light is reflected by the polarization beam splitter 30 to be received by the photographer's eye 3. Accordingly, there will be a 50% loss in the quantity of light to be received by the photographer's eye 3. Since the light reflected by the photographer's eye is made incident upon the polarization beam splitter 30 as P-polarized light, due to a reflection by the eye and the function of the ¼ wave plate, all of the reflected light will be transmitted through the polarization beam splitter 30 and received by the light receiving element.

Namely, in the case where a light source that emits unpolarized light is used, the quantity of light to be received by the light receiving element is reduced by only 50% when light is transmitted through and reflected by the polarization beam splitter 30. Accordingly, the quantity of light to be received by the light receiving element is twice that of prior art in which a half mirror is used as a beam splitter.

Figure 2:
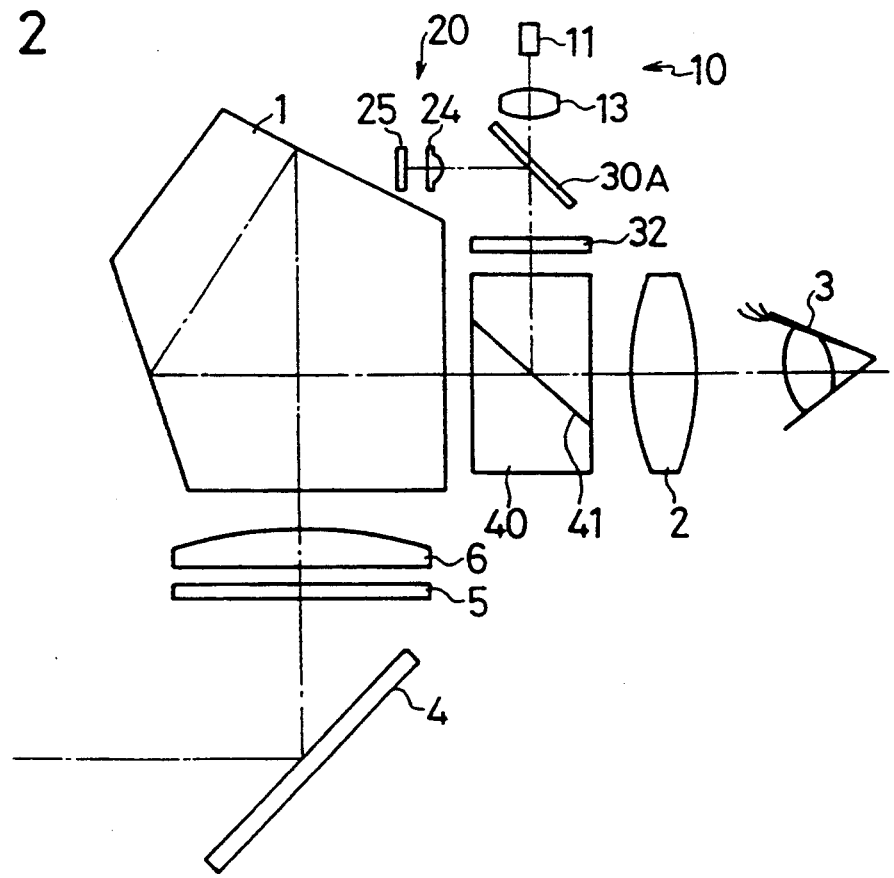
FIG. 2 is an illustrative view of an eye direction detecting device applied to a single lens reflex camera, according to a second embodiment of the present invention.

FIG. 2 shows a second embodiment of the present invention, and FIGS. 3 through 6 show four different modifications of the second embodiment. In the second embodiment, both the light emitting optical system 10 and the light receiving optical system 20 are located on the same side of the pentagonal prism 1, near the photographer's eye 3.

In FIG. 2, the light emitting optical system 10 includes a semiconductor laser 11, which emits infrared light, and a condenser lens 13. The light receiving optical system 20 includes an image reforming lens 24 and a CCD line sensor 25. Detecting infrared light emitted from the light emitting optical system 10 is P-polarized light which can be transmitted through the polarization beam splitter 30A, which reflects S-polarized light. The P-polarized light transmitted through the polarization beam splitter 30A is made incident upon a dichroic prism 40 through the ¼ wave plate 32.

The dichroic prism 40 has a beam splitting surface (dichroic surface) 41 which reflects infrared light and permits visible light to pass therethrough. Consequently, the detecting infrared light, emitted from the light emitting optical system 10, is reflected by the beam splitting surface 41 of the dichroic prism 40, and is made incident upon the photographer's eye 3 through the eyepiece lens 2.

The light reflected from the photographer's eye 3 is is again reflected by the beam splitting surface 41 of the dichroic prism 40 through the eyepiece 2, before being made incident upon the polarization beam splitter 30A through the ¼ wave plate 32. Since the reflected light is converted to S-polarized light when transmitted through the ¼ wave plate 32, the S-polarized light is reflected by the polarization beam splitter 30A and converged by the image reforming lens 24 to form an object image on the CCD line sensor 25.

Figure 3:
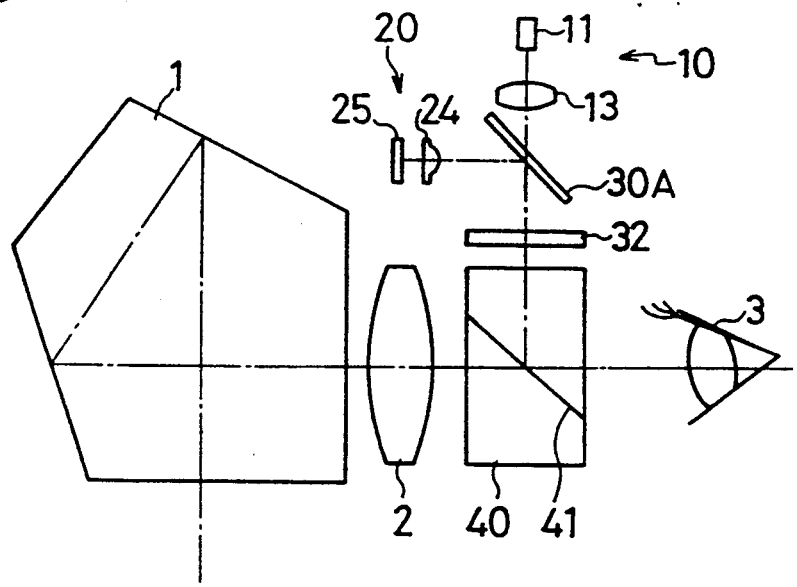
FIGS. 3, 4, and 5 are illustrative views of three modified arrangements of FIG. 2.
Figure 4:
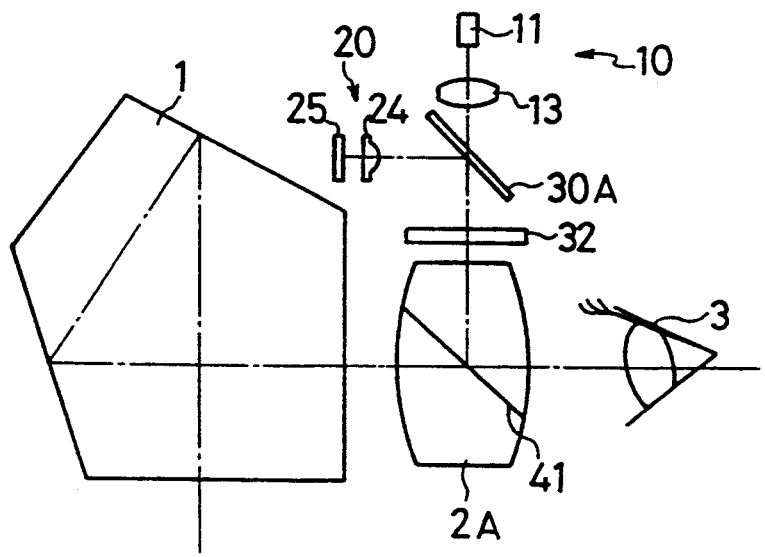

FIGS. 3 and 4 show two modified arrangements of the second embodiment shown in FIG. 2. In FIG. 3, the eyepiece lens 2 is located between the dichroic prism 40 and the pentagonal prism 1. In FIG. 4, the eyepiece lens 2A is provided with a beam splitting surface (dichroic surface) 41 having a wavelength selection function. The remaining structure in the arrangements illustrated in FIGS. 3 and 4 is basically the same as that in FIG. 2.

Figure 5:
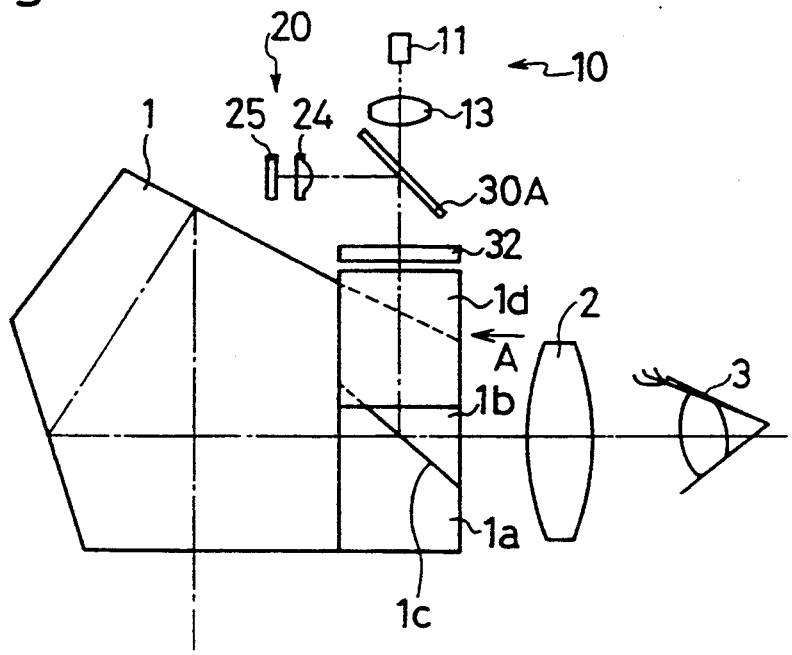
Figure 6:
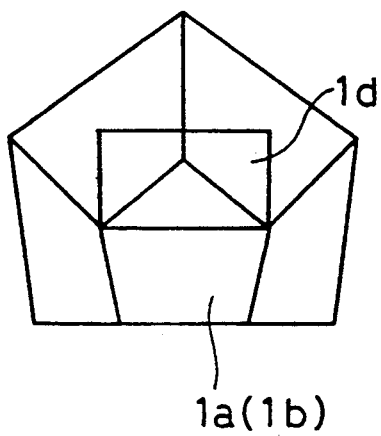
FIG. 6 is an end view of FIG. 5, as viewed in the direction of arrow A shown in FIG. 5; and, FIG. 7 is an illustrative view of an eye direction detecting device applied to a single lens reflex camera, according to a third embodiment of the present invention.

FIGS. 5 and 6 show a still further modified arrangement of FIG. 2. In FIGS. 5 and 6, two prisms 1a and 1b, corresponding to the shape of the pentagonal prism 1, are secured to the side surface of the pentagonal prism 1, on the side of the eyepiece 2, to define a dichroic connecting surface 1c therebetween. The prism 1b has an oblique upper surface in the shape of a roof, and a prism 1d having a recess corresponding to the oblique upper surface of the prism 1b, is secured thereto. The bundle of rays emitted from the light emitting optical system 10 enters the prisms 1, 1a, and 1b through the flat upper surface of the prism 1d.

Figure 7:
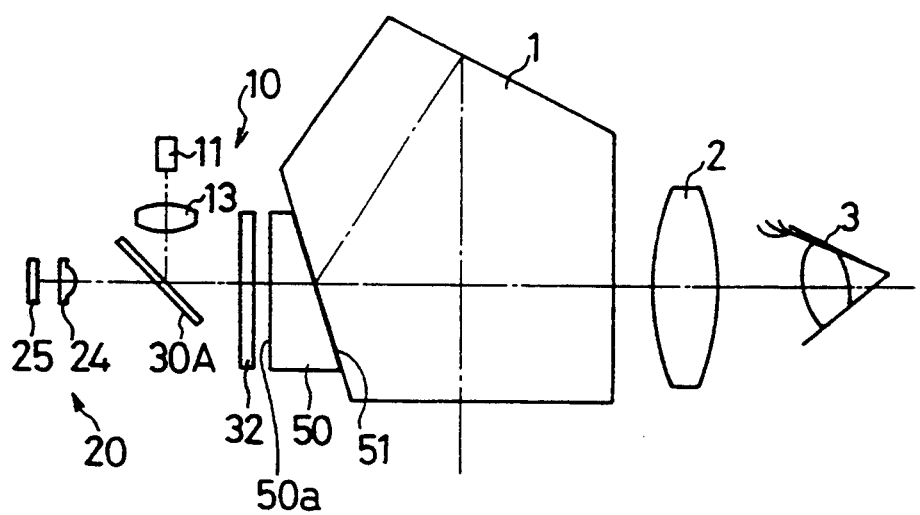

FIG. 7 shows a third embodiment of the present invention. In FIG. 7, both the light emitting optical system 10 and the light receiving optical system 20 are located on the same side of the pentagonal prism 1, opposite the side of the photographer's eye 3.

The pentagonal prism 1 is provided on the side surface thereof, opposite the eyepiece lens 2, with a prism 50. A dichroic surface is defined by a connecting surface 51 between the pentagonal prism 1 and the prism 50. The dichroic surface 51 reflects visible light and permits infrared light to pass therethrough. The front surface 50a of the prism 50 is normal with respect to the optical axis. The remaining structure of the arrangement shown in FIG. 7 is identical to that of the second embodiment shown in FIG. 2.

As can be seen from the above discussion, according to the present invention, employment of the ¼ wave plate and the polarization beam splitter ensures that light emitted from the light source, for line of sight detection, can be effectively received by the light receiving element, so that the line of sight can be precisely detected without increasing the quantity of light to be emitted from the light source.

I claim:

1. An eye direction detecting device for determining a direction in which an eye gazes, comprising:
    a light emitting system that emits a detecting light;
    a light receiving system;
    a polarization beam splitter that directs said detecting light in a first optical path so that said detecting light impinges upon the eye, and in a second optical path so that light reflected from the eye impinges upon said light receiving system to determine a direction in which the eye gazes; and
    a ¼ wave plate that is provided between said polarization beam splitter and the eye.

2. An eye direction detecting device, according to claim 1, wherein said light emitting system comprises a light emitter which emits infrared light.

3. An eye direction detecting device, according to claim 2, wherein said light emitter comprises a semiconductor laser which emits linearly polarized light.

4. An eye direction detecting device, according to claim 2, wherein said light emitting system comprises a dichroic surface which reflects said infrared light.

5. An eye direction detecting device, according to claim 2, wherein said light emitting system comprises an eyepiece lens and wherein said ¼ wave plate is located between said eyepiece lens and said polarization beam splitter.

6. An eye direction detecting device, according to claim 2, wherein said light emitting system comprises an eyepiece lens which is provided therein with a dichroic surface which reflects said infrared light.

7. An eye direction detecting device in a single lens reflex camera having a view finder with an eyepiece lens for determining an eye gazing direction of a user of said camera, comprising:
    a light emitting system that emits a detecting infrared light;
    a light receiving system;
    an eyepiece lens located proximate the eye of a user;
    a polarization beam splitter that directs said detecting infrared light in a first optical path so that said detecting infrared light passes through said eyepiece lens and impinges upon the eye of a user, and in a second optical path so that light reflected from the eye impinges upon said light receiving system to determine said gazing direction of the eye; and
    a ¼ wave plate that is provided between said polarization beam splitter and the eye of a user.

8. An eye direction detecting device, according to claim 7, wherein said ¼ wave plate is located between said polarization beam splitter and said eyepiece lens.

9. An eye direction detecting device, according to claim 7, wherein said detecting infrared light comprises linearly polarized infrared light.

10. An eye direction detecting device, according to claim 7, wherein said light emitting system is provided therein with a dichroic surface which reflects said detecting infrared light.

11. An eye direction detecting device, according to claim 10, wherein said dichroic surface is provided on an optical axis of said view finder.

12. An eye direction detecting device, according to claim 10, wherein said view finder comprises a pentagonal prism, and wherein said dichroic surface is provided on said pentagonal prism.

13. An eye direction detecting device, according to claim 10, wherein said dichroic surface is provided on said eyepiece lens.

14. An eye direction detecting device for determining an eye gazing direction of a user of said eye direction detecting device, comprising:
    a light emitting system for emitting detecting infrared laser light, said light emitting system including a polarization beam splitter, said polarization beam splitter functioning to at least one of reflecting said detecting infrared laser light or transmitting said detecting infrared laser light therethrough, and a ¼ wave plate through which said detecting infrared laser light reflected by or transmitted through said polarization beam splitter passes, wherein said detecting infrared light transmitted through said ¼ wave plate is made incident upon the eye; and,
    a light receiving system, in which light reflected by the eye is transmitted through said ¼ wave plate, and then transmitted through or reflected by said polarization beam splitter to thereby detect said gazing direction of the eye.

15. An eye direction detecting device, according to claim 14, wherein said infrared laser light comprises linearly polarized light.

* * * * *